Dec. 1, 1925.  1,564,013
H. G. PANK ET AL
SIGHT TESTING APPARATUS
Filed April 5, 1922
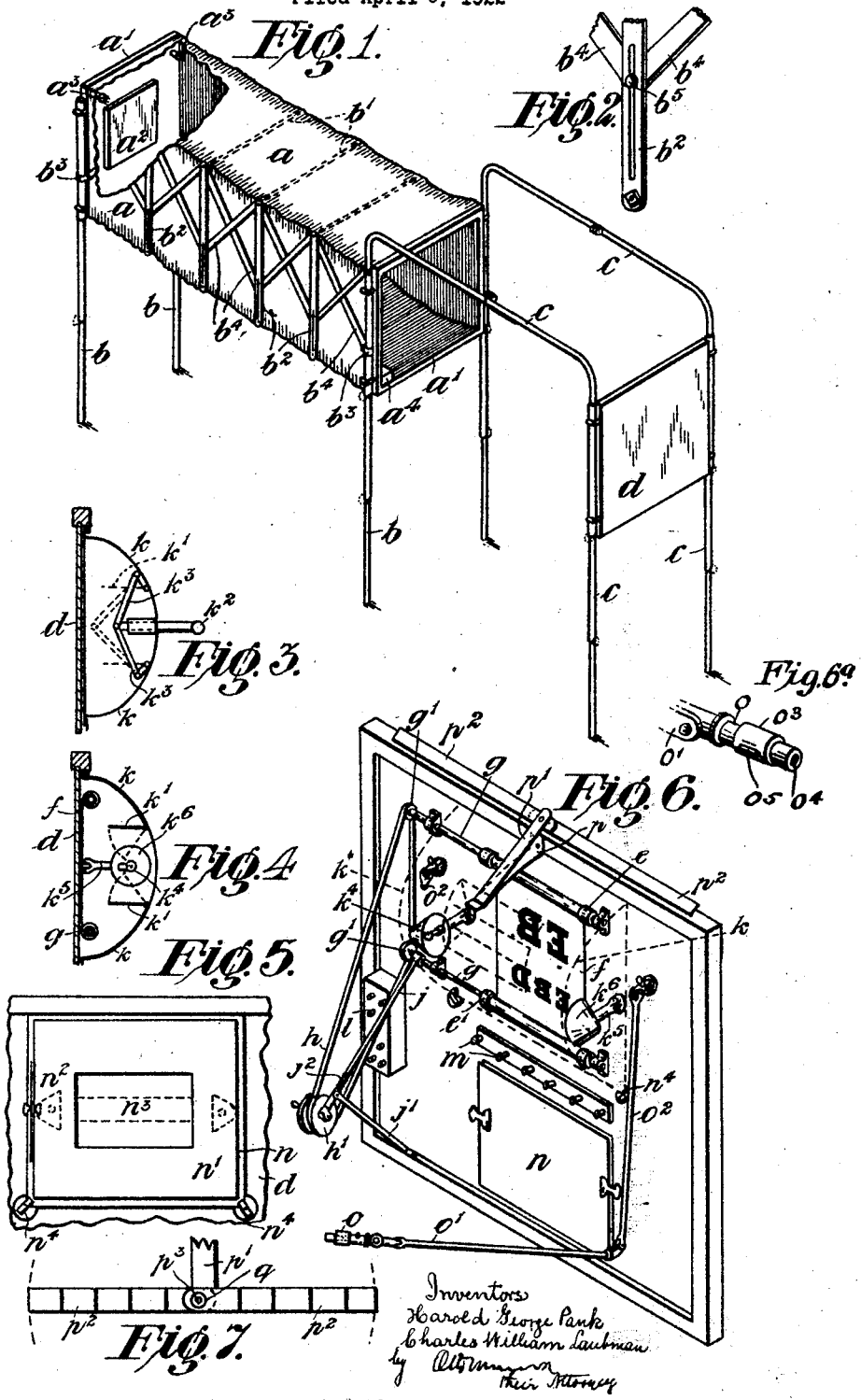

Patented Dec. 1, 1925.

1,564,013

UNITED STATES PATENT OFFICE.

HAROLD GEORGE PANK AND CHARLES WILLIAM LAUBMAN, OF ADELAIDE, SOUTH AUSTRALIA, AUSTRALIA.

SIGHT-TESTING APPARATUS.

Application filed April 5, 1922. Serial No. 549,704.

*To all whom it may concern:*

Be it known that HAROLD GEORGE PANK and CHARLES WILLIAM LAUBMAN, subjects of His Majesty the King of Great Britain, and residents of Rundle Street, Adelaide, in the State of South Australia, Commonwealth of Australia, have invented certain new and useful Improvements in and Connected with Sight-Testing Apparatus, of which the following is a specification.

Our invention relates to improvements in and connected with sight testing apparatus, the object of the same being to provide means to assist the relaxation of the accommodation of the eye and for testing the muscles and sight of the eye, means being also provided for controlling the light which is reflected upon interchangeable test letters or pictures with special apparatus for adapting the same for the required purposes.

But in order that our invention may be more clearly understood we will now describe the same by aid of the accompanying illustrative drawings wherein:—

Fig. 1 is a perspective elevation of the light tunnel.

Fig. 2 is a detail of portion of adjusting joint.

Fig. 3 is a side elevation of a chart box with apparatus for adjusting the aperture.

Fig. 4 is a section of Fig. 3 showing the chart roll and aperture flaps.

Fig 5 is an accommodation box for pictures, views, or letters which may be used inside or outside of the chart box.

Fig. 6 is a perspective view of the chart box frame showing adjustment apparatus and light device and other details of construction.

Figure 6a is a detailed view of the adjustable light and screen arrangement.

Fig. 7 is a device for testing the extrinsic muscles of the eye.

In each of the illustrations similar letters of reference are used to denote similar or corresponding parts wherever they occur.

In the drawing $a$ is the tunnel preferably of black fabric which is stiffened at each end with a square or oblong frame $a'$, one end of the frame being open as illustrated, the opposite end being closed and provided with a mirror $a^2$ and electric lights $a^3$ for directing the vision. These lights may be either of white glass or of distinctive coloured glass, and are separately operated from any convenient switch such as the switch $a^4$.

The tunnel is portable and is supported by extension legs $b$ preferably made on the telescopic principle and the tunnel is also spread and stretched by horizontal spreaders $b'$ and vertical spreaders $b^2$, the latter being adjustable and adapted to be secured by any convenient means such as a screw or wing nut $b^5$ as illustrated in Fig. 2 of the drawings. Diagonal stays $b^4$ are also fitted to the vertical spreaders and operated on the lazy-tongs principle, a slotted adjustment guide being arranged as in Fig 2. Collapsible bellows may be used instead of the lazy tongs.

At the open end of the tunnel we arrange a supplemental or extension frame $c$ which may be built on the telescopic principle or otherwise rendered collapsible for purposes of transport or stowage and upon this frame we mount the chart box frame $d$ with its associated parts. The extension frame is furnished with a fabric or other cover.

The chart box frame supports two rollers $e$ and $e'$ both of which are mounted in conveniently placed brackets as shown and are used for the support of the chart $f$ consisting of letters or figures of various sizes printed on calico or paper and attached to both rollers so that as one end is unfolded the other end is correspondingly rolled up.

These rollers are operated by extension rods $g$ provided with pulley wheels $g'$ for the accommodation of a belt or band $h$ which engages the rollers and is kept tight by the belt wheel $h'$, said belt wheel being swingingly supported upon the hinge rods $j$ and $j'$ the former of which is rendered adjustable by the addition of a telescopic end which is governed by the tension spring $j^2$.

A small handle on the belt wheel $h'$ is supplied for rotating the wheel and for imparting rotary motion to the rollers through the intermediate gearing.

In Figs. 3 and 4 as well as in Fig. 6 we have shown a chart box for enclosing the chart. This chart box is preferably constructed of sheet metal as indicated at $k$, the middle portion being furnished with flaps $k'$ capable of being closed or fully open as in Fig. 4 or opened to a limited degree, mechanism of a suitable nature for this purpose being provided, such for instance as the press handle $k^2$ and its associated levers $k^3$ as will be readily understood on reference to Figs. 3 and 4 of the drawings.

Inside of the box we provide chart lights $k^4$ which are preferably controlled by electric current and are mounted on hinged brackets $k^5$ and fitted with covers $k^6$. Switches for controlling these lights and other lights are shown at $l$ and provision is made for the accommodation of a series of coloured lights of bulbs $m$ which may be detached and fitted to the various electric points of the device according to requirements.

The test letters and lights are uncovered for daylight testing, the lights may be used at all times if necessary to minimize shadows, but in general practice the test letters and lights will be covered by the chart box which however is rendered removable.

For further testing the sight we provide pictures, views or figures which may be fitted in a frame $n$ and are carefully selected. They may be held in position by a cover plate $n'$ in which there is an aperture $n^2$ which is rendered adjustable by a sliding shutter $n^3$ so as to enable the whole or any part of the enclosed view or picture to be exposed through the aperture. The frame which contains the pictures may either be placed inside or outside of the light box or the pictures contained therein may be separately taken out and placed in the light box.

Turn buttons or cleats are provided at $n^4$ for the convenient removal or insertion of additional pictures and supplemental lights $o$, which are screened on the outside and fitted on rods $o'$ and $o^2$ having swivel or universal joints to render the light easy of adjustment.

These supplemental lights which are conveniently placed are also used for retinoscopic and ophthalmoscopic examination. On the chart box frame or in other convenient position we mount a bracket $p$ (see Fig. 7) at the outer end of which there is a hinge to carry the extension arm $p'$ upon the extremity of which a graduated rod $p^2$ is mounted, the rod being formed of two parts and pivotally retained by the hinge pin or pivot $p^3$ and in front of this device the screened light $q$ is fitted.

The mounting of the rod enables it to be placed in a horizontal position or in a vertical position or at any oblique angle or one half of the rod may be turned at right angles to the other half. The screening of the light can effectively be achieved by surrounding it with a rotatably mounted metal cover $o^3$ (see Fig. 6ª) having a small hole or opening $o^4$ in the end so as to present a point of light to the patient, the cover also having holes $o^5$ or slots on each side which allow a limited amount of light to fall on the graduations of the graduated rod.

This device when used in conjunction with the Maddox rod (which is well known in sight testing but forms no part of this invention) is for testing the extrinsic muscles of the eye, the hooded light being used to prevent side rays. The graduations afford means for indicating or testing the degrees of extrinsic muscular error in sight, the patient being afforded an opportunity of expressing to the operator the degree of deviation (if any) upon the graduations.

Our device is used in conjunction with the Maddox rod or any other method and with the assistance of a concentrated point of light from which sufficient light is permitted to escape thereby illuminating the markings on the indicator without interfering with the direct light as presented to the patient. The marked indicator rotates and readings may be taken in any meridian and the refractionist is enabled to determine the exact degrees of extrinsic muscular defect.

The complete structure above described is capable of being detached and folded together so as to occupy a very small space when not in use or when packed for transit purposes, the section of the tunnel being approximately two feet square, and the entire length of the device being approximately only eleven feet six inches, but we do not confine ourselves definitely to these dimensions.

Our device when constructed and arranged in the manner indicated can be set up in a comparatively small room, and the patient to be examined is seated or allowed to stand with his back to the chart box at the rear of the structure, his head, however, being clear of the illuminated box or other testing portions.

When the lights are turned on to the letters and symbols or when the other appliances previously referred to are used they are reflected in the mirror at the far end of the cabinet or tunnel but at that distance will accurately be reduced in size as though they were set at a distance of twenty feet or thereabouts from the patient by reason of the fact that the distance between the light box and the mirror which is approximately ten feet will have the appearance of being double that distance.

We claim—

1. In a sight testing apparatus, a tunnnel frame adjustably supported and comprising a series of parallel vertically disposed side stays, cross bars movable on a central pivot, each bar being pivoted at one end to the stays, the other ends sliding in slots in the stays, a closure at one end of said tunnel, a mirror and lighting facilities carried by the closure for directing the vision, and an enclosing flexible cover for said frame.

2. In a sight testing apparatus, the combination of a collapsible tunnel having a chart disposed therein, a sheet metal chart box adapted to cover said chart and having adjustable shutters to permit the entrance of daylight rays to the chart or to exclude such rays from the latter, and means for adjusting said shutters.

3. A sight testing apparatus, as claimed in claim 2, including lights disposed in said box for illuminating the interior of the latter behind the said chart, substantially as described.

4. A sight testing apparatus, as claimed in claim 3, including lights disposed in said box for illuminating the interior of the latter behind the said chart, and hoods carried by the said lights for screening the rays and directing the latter in the direction of the chart, substantially as described.

5. In improvements in and connected with sight testing apparatus the combination of a graduated rod, a hooded light comprising a rotatable hood member carried by said apparatus and having an opening adapted to show a frontal point of light and having further side openings in the hood to illuminate the graduating of the rod without directly showing side rays to indicate the degrees of deviating error in sight.

6. In improvements in and connected with sight testing apparatus, the combination of a graduated arm formed in two parts pivotally connected for indicating and testing the degrees of extrinsic muscular error in sight, and a hooded light centrally disposed opposite to the pivotal joint to throw light rays on the graduated surface of the arm.

In testimony whereof they have affixed their signatures.

HAROLD GEORGE PANK.
CHARLES WILLIAM LAUBMAN.